May 19, 1931. A. H. BOILEAU 1,805,753
POWER CHURN
Filed June 4, 1928 3 Sheets-Sheet 2
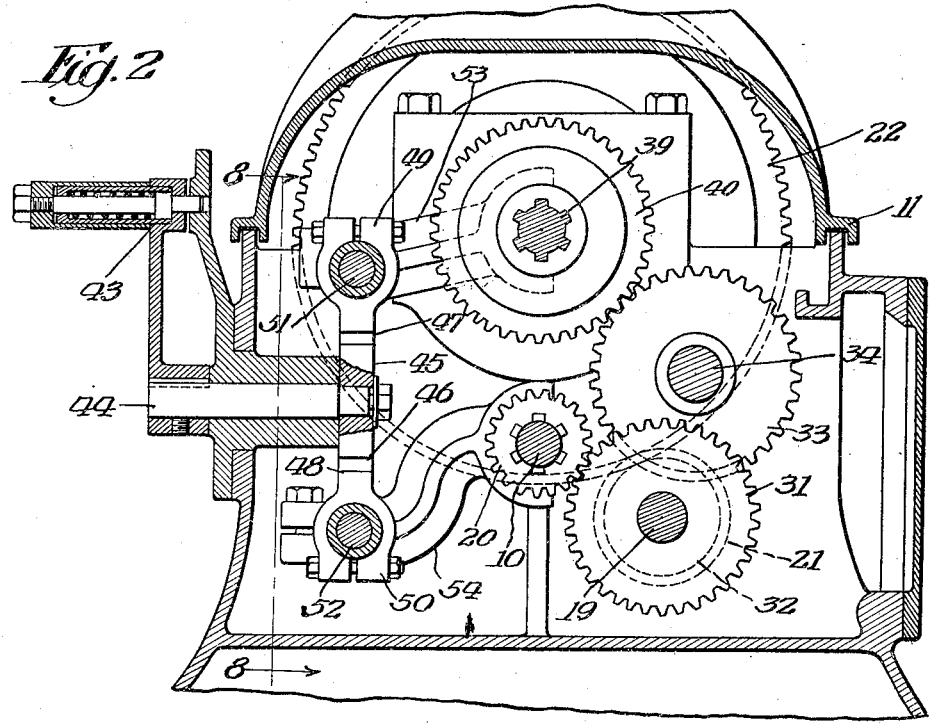
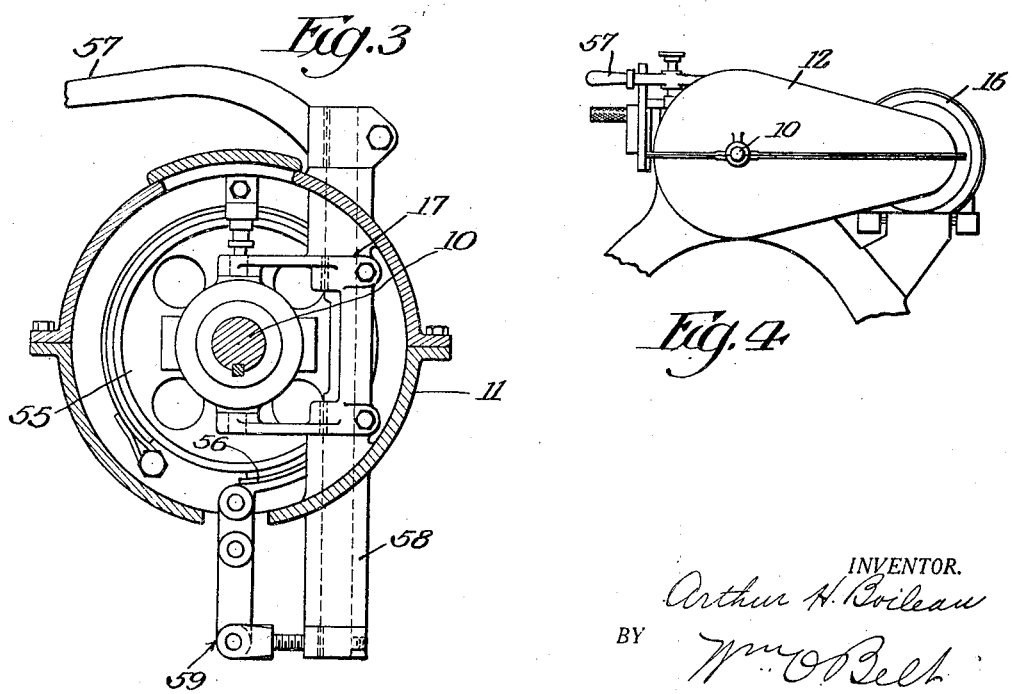
INVENTOR.
Arthur H. Boileau
BY
Wm. O. Belt
ATTORNEY.

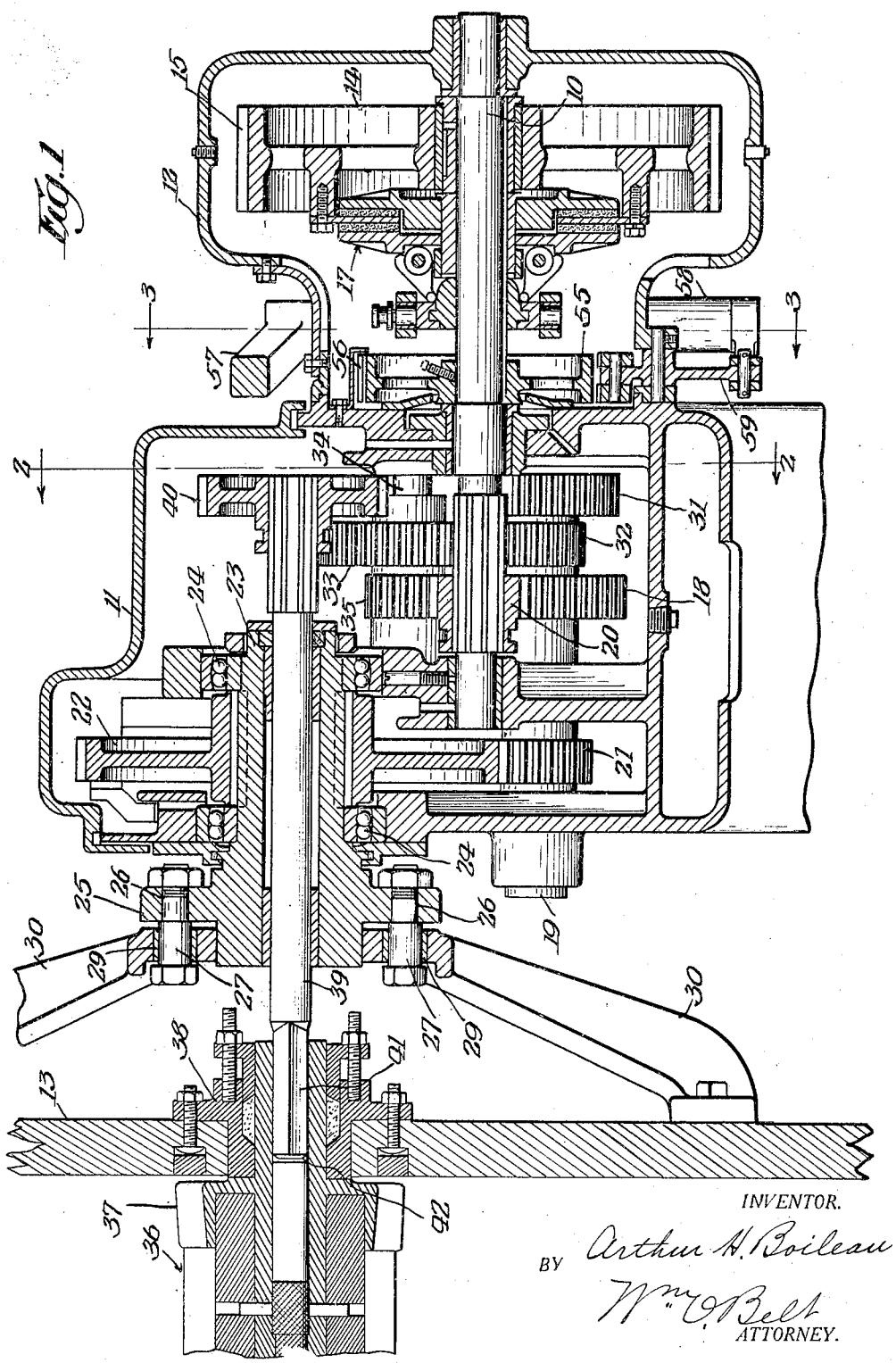

May 19, 1931. A. H. BOILEAU 1,805,753
POWER CHURN
Filed June 4, 1928 3 Sheets-Sheet 3
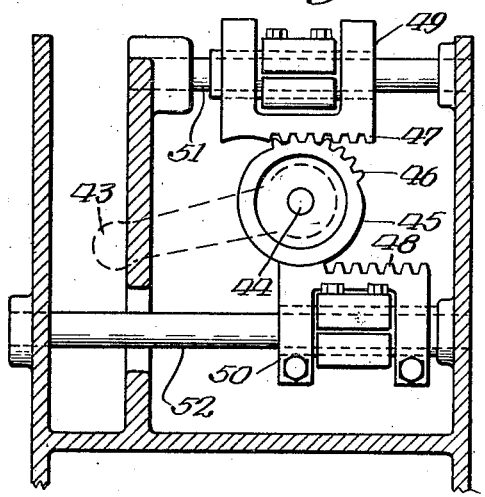
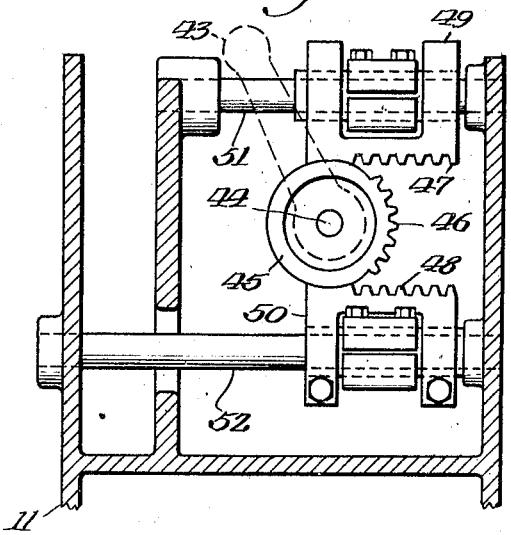
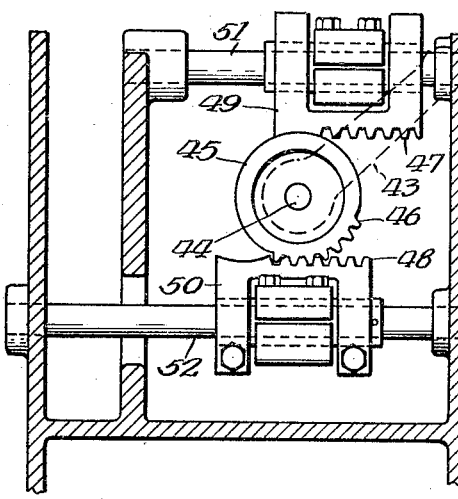
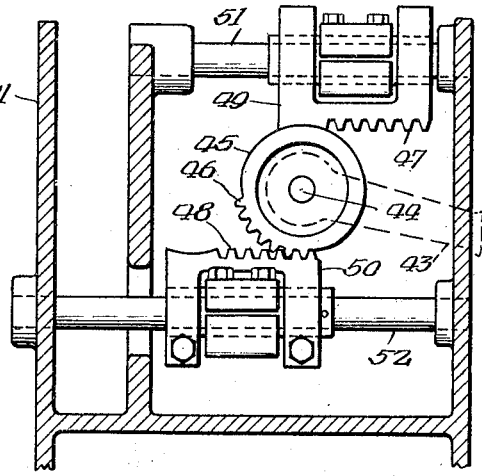
INVENTOR.
Arthur H. Boileau
BY
ATTORNEY.

Patented May 19, 1931

1,805,753

UNITED STATES PATENT OFFICE

ARTHUR H. BOILEAU, OF CEDAR RAPIDS, IOWA, ASSIGNOR, BY MESNE ASSIGNMENTS, TO CHERRY-BURRELL CORPORATION, OF WILMINGTON, DELAWARE, A CORPORATION OF DELAWARE

POWER CHURN

Application filed June 4, 1928. Serial No. 282,750.

This invention relates to a novel driving mechanism for operating the drum and roll of a power churn.

The primary object of the invention is to selectively operate the drum alone and at various speeds or to operate the drum and roll together under certain conditions.

Another object is to control the operation of the driving mechanism in a novel manner.

In the accompanying drawings illustrating a selected embodiment of the invention, the views are as follows:

Fig. 1 is a detail longitudinal sectional view of the driving mechanism and the roll.

Fig. 2 is a transverse sectional view on the line 2—2 of Fig. 1.

Fig. 3 is a transverse sectional view on the line 3—3 of Fig. 1.

Fig. 4 is a detail end view.

Figs. 5 to 8 are diagrammatic views showing the shifting mechanism in various positions; Fig. 8 being on the line 8—8 of Fig. 2.

Referring to the drawings, 10 designates a main drive shaft which is suitably mounted in the gear box 11 and the casing 12. The gear box is arranged adjacent one end of a churn drum 13 and supports the casing. A driving sprocket 14 loosely mounted on the shaft 10 is driven by a silent chain 15, Fig. 1, from the motor 16, Fig. 4. A clutch 17, Fig. 1, is arranged on the main drive shaft 10 and imparts motion from the sprocket 14 to the shaft 10.

A gear 18 is loosely mounted on a counter shaft 19 which is fixed in the gear box 11 and id adapted to be driven by a pinion 20 splined on the shaft 10. A gear 21 also loose on the shaft 19, and integral with the gear 18, drives the ring gear 22. This ring gear is fixed to the hollow ring gear or drum driving shaft 23 which is mounted in bearings 24, 24 supported in the gear box 11. A collar 25, provided with holes 26, is arranged on the ring gear shaft 23 and extends outside of the gear box as clearly shown in Fig. 1. Bolts 27 pass through the holes 26 and through bushed holes 29 in the spider 30 which is fastened to the drum 13. The holes 29 are relatively large and provide a semi-flexible connection between the spider and the collar so that any distortion of the drum, due to swelling, will have no effect upon the driving mechanism. The parts just described cause rotation of the drum at high speed and are shown in that position in Fig. 1. This arrangement is described and claimed in my co-pending application Serial No. 431,387, filed February 26, 1930.

When the churn is to be run at low speed the pinion 20 is shifted until it meshes with the gear 31 which is loose on the shaft 19. A gear 32 also loose on the shaft 19 is integral with the gear 31 and meshes with and drives a gear 33 loosely mounted on the intermediate shaft 34. A gear 35 also loose on the shaft 34, and integral with the gear 33, meshes with the gear 18 and permits a reduction in speed of about 4 to 1 ratio as compared with high speed.

A roll 36 arranged in the drum is rigidly mounted in a roll box 37 mounted adjacent to the end of the drum. The roll box extends through the packing gland 38 which is arranged outside of the drum and holds the roll 36 in position. A roll driving shaft 39 mounted in the hollow shaft 23 has a gear 40 splined thereon which is adapted to be shifted into meshing relation with the gear 33 when the drum is running at low speed. The shaft 39 has a square end 41 which is received in a square hole 42 in the roll box to form a driving connection to rotate the roll 36. The gear 40 is arranged to rotate the roll in a direction opposite to the rotation of the drum.

When the pinion 20 is shifted midway between the gears 18 and 31, Fig. 1, or in the same lateral plane as the gears 32 and 33, the pinion 20 will idle, and the other gears will remain stationary as the gears 32 and 33 are not in meshing relation with the pinion, and the machine is in neutral position.

The shifting of gears is accomplished by a shifting handle 43, Fig. 2, which is located outside of the gear box and operates a shaft 44 to which the shifting pinion 45 is attached. This shifting pinion is provided with teeth 46 which are adapted to engage the teeth 47 and 48 on the shifting racks 49 and 50 respectively. The rack 49 is slidably mounted on the shaft 51 and the rack 50 is slidably mounted on the shaft 52, as clearly shown in Figs. 1 and 5 to 8. A fork or yoke 53 connected to the shifting rack 49 engages the gear 40 for bringing this gear into, and out of, engagement with the gear 33 to control the operation of the roll shaft 39. The shifting rack 50 carries a fork or yoke 54 which engages the pinion 20 for shifting this pinion on the shaft 10.

In Fig. 1 the gears are in position to rotate the drum 13 at high speed and the shifting handle 43 is in the position shown in broken lines in Fig. 8. In this position the teeth 46 on the shifting pinion 45 are in engagement with the teeth 48 on the rack 50 and the pinion 20 is in engagement with the gear 18. The rack 49 is not engaged with the shifting pinion 45 and the gear 40 is out of engagement with the gear 33 so the roll shaft 39 remains idle.

When the handle 43 is shifted to the position shown in broken lines in Fig. 7 the shifting pinion 45 engages the rack 50 to move the pinion 20 out of engagement with the gear 18 and the churn is in idle or neutral position. The pinion 20 is not in engagement with any of the driving gears and it merely idles on the shaft 20. The shifting pinion 45 is not in engagement with the rack 49 so the gear 40 still remains out of mesh with the gear 33 and the roll shaft 39 is not moving.

By moving the handle 43 to the position shown in broken line in Fig. 6 the shifting pinion 45 has moved the rack 50 to bring the pinion 20 into meshing relation with the gear 31 and the churn will operate at low speed. The shifting pinion 45 has not yet engaged the rack 49 so the gear 40 still remains in idle or in non-operative position.

To operate the roll shaft 39 the handle 43 is moved to the position shown in broken lines in Fig. 5. The shifting pinion 45 will then be engaged with the rack 49 and the gear 40 will be shifted into engagement with the gear 33 to operate the roll shaft 39. In this position, the pinion 45 will be out of engagement with the rack 50 so the pinion 20 will remain in engagement with the gear 31 and the drum will continue to rotate at low speed. By reverse operation of the handle, the gears may be shifted to any one of the above mentioned positions.

A brake sheave 55, Figs. 1 and 3, is mounted on the shaft 10 and a band 56 surrounding the sheave is operated by a lever 57 which is connected to the clutch operating shaft 58 and operates the clutch 17. A plurality of links designated generally by the numeral 59, Fig. 3, operatively connect the brake band 56 with the clutch operating shaft 58 so that when the lever 57 is moved in one position, to the left Fig. 1, the clutch 17 will be disengaged from the driving sprocket 14 and the band 56 will be tightened on the sheave 55 to stop further movement of the drive shaft 10. When the lever 57 is moved from stopping position to right, and in the position shown in Fig. 1, the brake band 56 will be released from the sheave 55 and the clutch 17 will be in engagement with the driving sprocket 14 and the shaft 10 is free to rotate.

The invention provides a novel and simple arrangement for selectively driving the churn drum, and the churn roll and drum, and permits the drum to rotate at various speeds. The clutch and brake operating mechanism provides a novel arrangement for starting and stopping the drum and the roll; and the means for making a driving connection between the roll and the roll shaft prevents the cream or butter from entering and remaining in the connection between the operating mechanism and the roll, and prevents any dirt or grease on the roll shaft from getting into the drum.

Changes may be made in the form, construction and arrangement of the parts without departing from the spirit of the invention or sacrificing any of its advantages, and the right is reserved to make all such changes as fairly fall within the scope of the following claims:

I claim:

1. In a churn wherein there is included a drum, a drum driving shaft, a roll in the drum, a roll driving shaft, and a main drive shaft, the combination therewith of a counter shaft adjacent said main drive shaft, gearing for rotating the drum driving shaft from the counter shaft, a shiftable gear on the main drive shaft selectively engaging the gearing on the counter shaft for rotating the drum driving shaft at different speeds, and means for rotating the roll driving shaft from the main drive shaft.

2. In a churn wherein there is included a drum, a drum driving shaft, a roll in the drum, a roll driving shaft, and a main drive shaft, the combination therewith of a counter shaft adjacent said main drive shaft, gearing for rotating the drum driving shaft from the counter shaft, means for rotating the drum driving shaft from the counter shaft at different speeds, and a shiftable gear on the roll driving shaft for rotating the roll driving shaft when the drum driving shaft is operating at a certain speed.

3. In a churn wherein there is included a drum, a drum driving shaft, a roll in the drum, a roll driving shaft, and a main drive shaft, the combination therewith of a counter shaft adjacent said main drive shaft, gearing for rotating the drum driving shaft from the counter shaft, and shiftable gears on the main drive shaft and roll driving shaft for selectively engaging said gearing to rotate the drum driving shaft at different speeds and for rotating the roll driving shaft when the drum driving shaft is rotating at a certain speed.

4. In a churn wherein there is included a drum, a drum driving shaft, a roll in the drum, a roll driving shaft, and a main drive shaft, the combination therewith of a sprocket loose on said drive shaft, means for driving said sprocket, a clutch on said main drive shaft and engaging said sprocket, a counter shaft adjacent said drive shaft, and shiftable gears on the main drive shaft and roll driving shaft for selectively engaging said gearing to rotate the drum driving shaft at different speeds and for rotating the roll driving shaft when the drum driving shaft is rotating at a certain speed.

5. In a churn wherein there is included a drum, a drum driving shaft, a roll in the drum, a roll driving shaft, and a main drive shaft, the combination therewith of a sprocket loose on said drive shaft, means for driving said sprocket, a clutch on said main drive shaft and engaging said sprocket, a counter shaft adjacent said drive shaft, a shiftable gear on the main drive shaft selectively engaging the gearing on the counter shaft for rotating the drum driving shaft at different speeds, a shiftable gear on the roll driving shaft for rotating the roll driving shaft when the drum driving shaft is operating at a certain speed, and slidable means for selectively shifting said shiftable gears.

6. In a churn wherein there is included a drum, a drum driving shaft, a roll in the drum, a roll driving shaft, and a main drive shaft, the combination therewith of a sprocket loose on said drive shaft, means for driving said sprocket, a clutch on said main drive shaft and engaging said sprocket, a counter shaft adjacent said drive shaft, shiftable gears on the main drive shaft and roll driving shaft for selectively engaging said gearing to rotate the drum driving shaft at different speeds and for rotating the roll driving shaft when the drum driving shaft is rotating at a certain speed, a sheave on said main drive shaft, a brake band for said sheave, and means for simultaneously operating said clutch and brake band.

7. In a churn wherein there is included a drum, a drum driving shaft, a roll in the drum, a roll driving shaft, and a main drive shaft, the combination therewith of a counter shaft adjacent said main drive shaft, gearing for rotating the drum driving shaft from the counter shaft, a spider connected to the drum, and pin and slot means providing a semi-flexible connection for attaching said spider to said drum driving shaft.

8. In a churn wherein there is included a drum, a drum driving shaft, a roll in the drum, a roll driving shaft, and a main drive shaft, the combination therewith of a sprocket loose on said main drive shaft, means for driving said sprocket, a clutch on said main drive shaft and engaging said sprocket, a counter shaft adjacent said main drive shaft, gearing for rotating the drum driving shaft from the counter shaft, pin and slot means semi-flexibly connecting said spider to said drum driving shaft, and means securing said spider to said drum.

ARTHUR H. BOILEAU.